United States Patent [19]

Greenig et al.

[11] 4,316,199
[45] Feb. 16, 1982

[54] GRAPHIC FORMS OVERLAY APPARATUS

[75] Inventors: Nelson L. Greenig, Norristown; Richard M. Shelton, Oreland, both of Pa.

[73] Assignee: Sperry Corporation, New York, N.Y.

[21] Appl. No.: 110,286

[22] Filed: Jan. 7, 1980

[51] Int. Cl.³ .................. G01D 15/14; H04N 1/22
[52] U.S. Cl. .................. 346/160; 358/302; 358/300
[58] Field of Search .............. 346/160; 358/300, 302, 358/289, 285, 78, 213, 264, 267; 355/3 R

[56] References Cited

U.S. PATENT DOCUMENTS

| | | | |
|---|---|---|---|
| 3,698,006 | 10/1972 | Oushinsky | 346/160 |
| 3,819,854 | 6/1974 | Kolb | 358/78 |
| 3,820,123 | 6/1974 | Ammann | 354/7 |
| 3,864,697 | 2/1975 | Dillon | 354/5 |
| 4,012,585 | 3/1977 | Chen | 358/285 |
| 4,060,319 | 11/1977 | Meaney | 358/300 |
| 4,081,843 | 3/1978 | Okano | 358/213 |
| 4,122,462 | 10/1978 | Hirayama | 358/300 |
| 4,201,994 | 5/1980 | Hoshito | 346/160 |

Primary Examiner—James W. Moffitt
Assistant Examiner—Alan Faber
Attorney, Agent, or Firm—Robert E. Lee, Jr.; Kenneth T. Grace; Marshall M. Truex

[57] ABSTRACT

The present invention relates to apparatus for printing graphic forms simultaneously with information data. A graphic forms master is mounted on a relatively small forms drum which is coupled to rotate simultaneously with a photo-sensitive print drum. Light is reflected from the graphic forms master to a light sensitive transducer from where electrical signals, representing the graphics form, are transmitted to a signals merging circuit. Information data signals are also transmitted to the signals merging circuit. The signals merging circuit is connected to a single light source-optical system to selectively pass light to the photo-sensitive print drum in response to the electrical signals to provide an image thereon representing both the graphic form and the information data. Automatic lateral alignment of the graphic forms data and information data is accomplished through cooperation of an alignment mark on the graphic forms master with a portion of the signals merging circuit.

6 Claims, 6 Drawing Figures

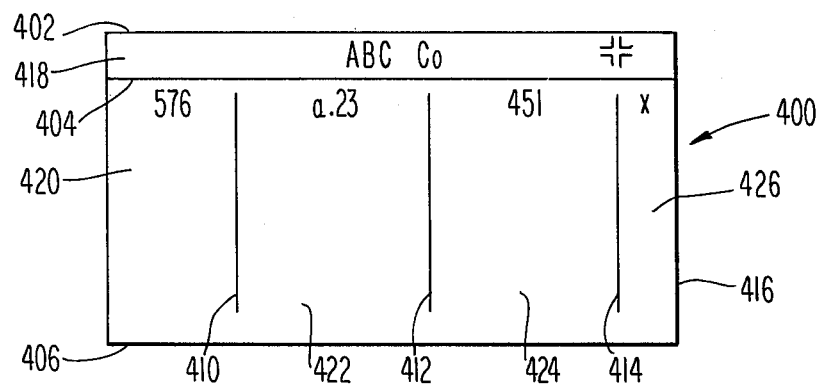
Fig. 2
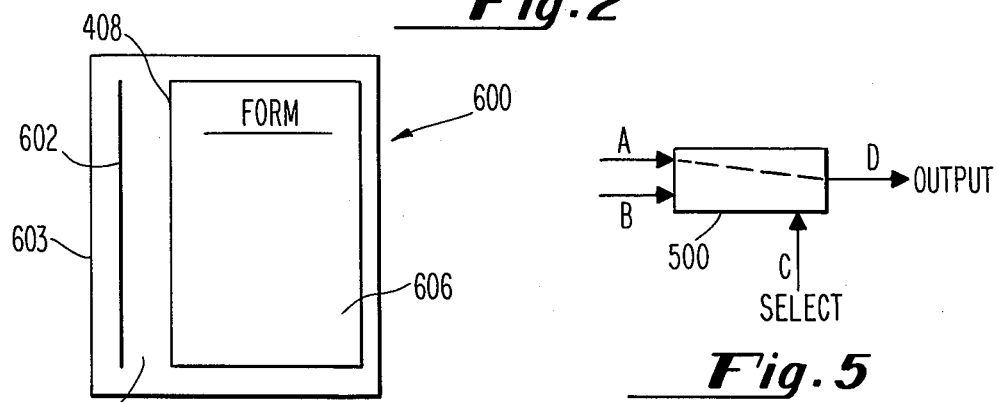
Fig. 4
Fig. 5
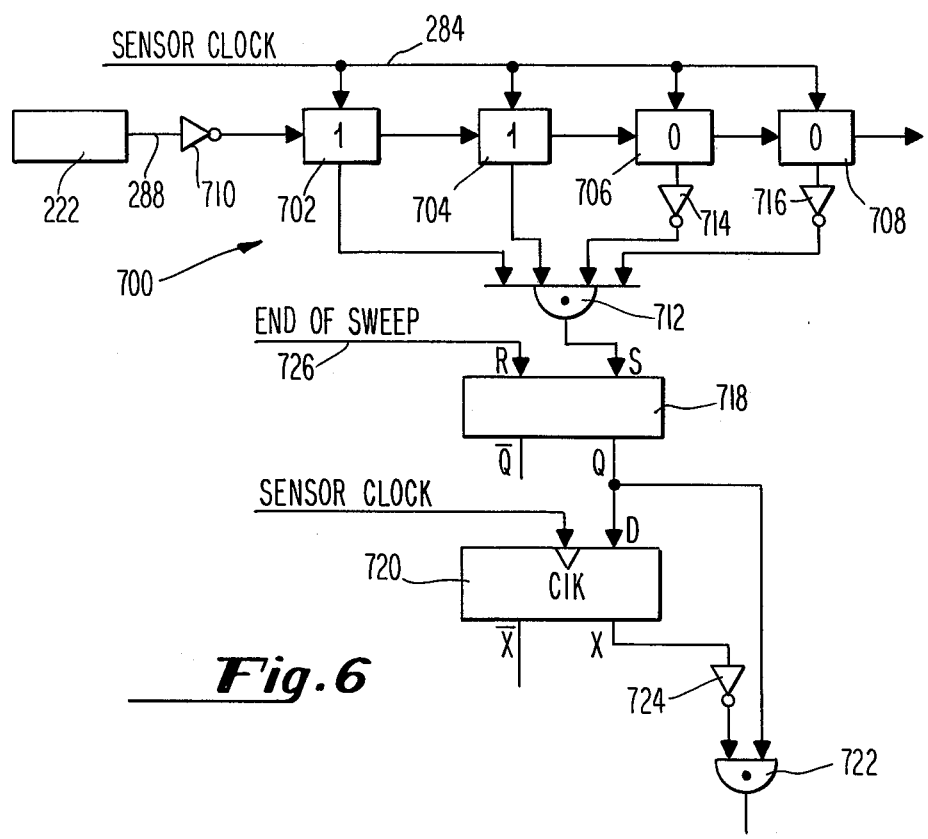
Fig. 6

GRAPHIC FORMS OVERLAY APPARATUS

BACKGROUND OF THE INVENTION

This invention relates to a method and apparatus for the simultaneous printing of graphic forms data and information data by dot matrix printers, such as laser-xerographic printers, used as output devices for data processing systems.

It is sometimes desirable to print information data from a data processing source on a company, governmental or graphic form. In the past, this has required that the forms be printed first and then aligned on the printer to have the printed data appear in the correct locations on the form. However, the use of preprinted forms instead of blank paper proved to be expensive, and alternate approaches were developed whereby graphic forms could be overlayed optically on the information data as it was being printed. One such approach, called the forms flash approach for use with laser-xerographic printers, transmits light through a transparency of the desired forms pattern onto an optical system which directs the transmitted light onto the printer's photo-conducting drum. However, the light source and optics in the forms flash method generally provides print of different intensity and resolution than the print provided by the laser light source resulting in different shades of print on the final output copy. In addition, in the forms flash system, the forms drum must be almost as large as the actual form, hence, the forms flash devices are bulky, primarily optomechanical in nature, sensitive to adjust, and moderately expensive.

SUMMARY OF THE INVENTION

Applicant's invention comprises a forms overlay apparatus for printing both graphic forms data and information data in a single printing operation. The printing means, in the preferred embodiment, includes a light sensitive, rotational printing member such as a xerographic drum which is coupled, either mechanically or electrically, to a forms master drum to effect synchronous rotational movement there between. A forms master is disposed on said forms master drum and light from a light source is directed to and reflected from said forms master. The reflected light is intercepted by a light sensitive logic means for producing electrical signals representing the graphic forms image. The electrical signals are transmitted to logic circuitry whereat they are merged with electrical signals representing information data. Signals from the logic circuitry are transmitted to a light source-optical system means which includes a single laser beam source. The laser beam source projects spots of light onto the xerographic drum. When the projected spots of light are considered as a whole, they represent both graphic forms data and information data. The reflected light from the forms drum is optically reduced before being electronically processed, and, hence, a relatively small drum can be used. An alignment mark positioned on the forms master at a predetermined location cooperates with portions of the logic circuitry to provide an automatic lateral alignment means for the apparatus.

BRIEF DESCRIPTION OF THE DRAWING

The objects and features of the present invention will be better understood in view of the following description taken in conjunction with the accompanying drawings:

FIG. 2 is a representation of a graphic form overlayed on data.

FIG. 4 shows an example of a graphic form master with an alignment mark thereon.

FIG. 5 is an enlarged block diagram of a first portion of the block diagram of FIG. 3.

FIG. 6 is a more detailed block diagram of a second portion of the block diagram of FIG. 3.

DETAILED DESCRIPTION OF THE DRAWINGS

Figure 1:
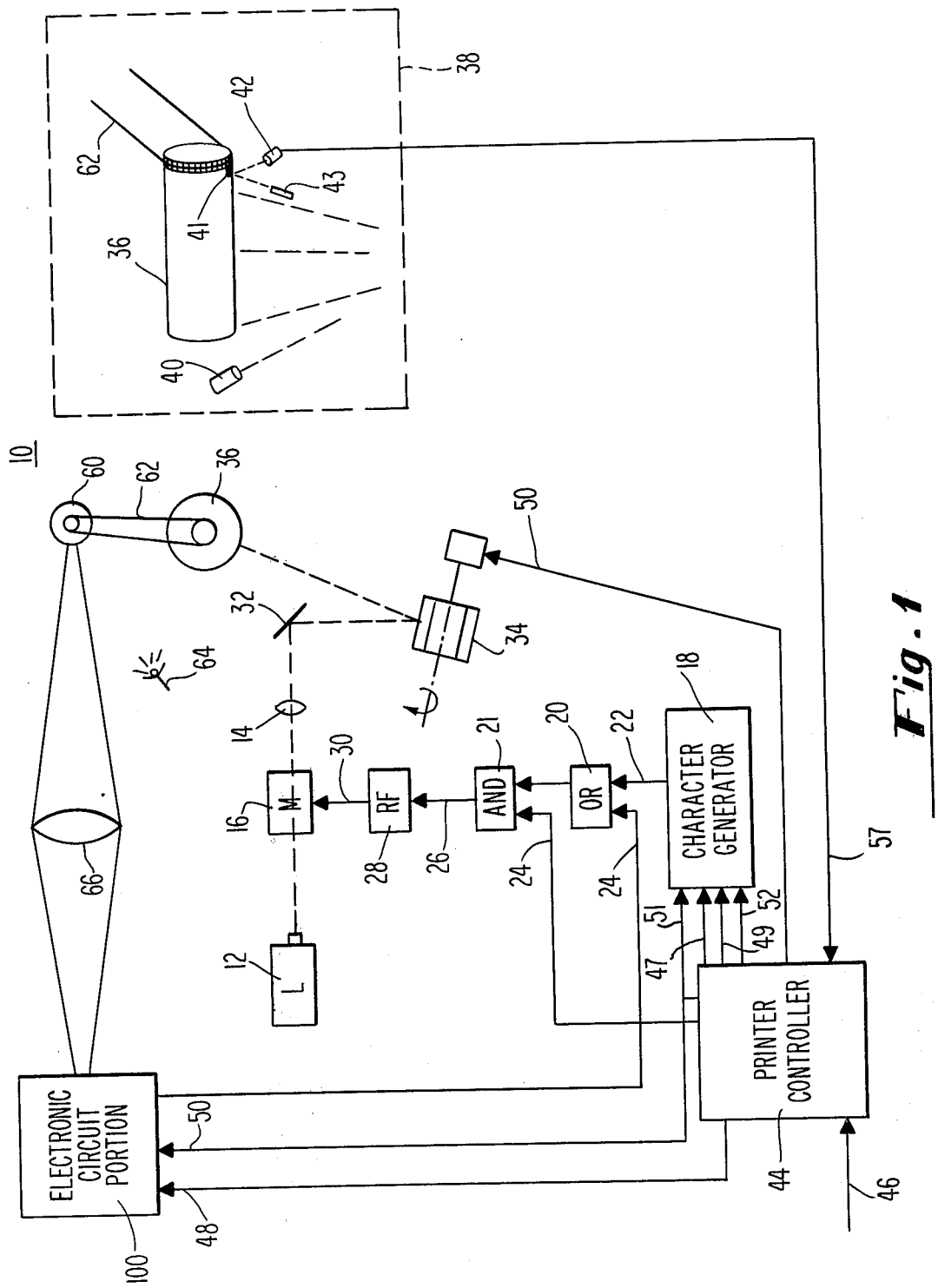
FIG. 1 is a preferred embodiment block diagram of the graphic forms overlay apparatus in combination with a non-impact printer apparatus.

FIG. 1 is in part a block diagram of a printing system such as a laser-xerographic printer designated generally 10. A laser light source 12 transmits a beam of light through an accousto-optical modulator 16, which, in the preferred embodiment, comprises a slab of glass with piezo-electric electrodes attached thereto. A suitable modulator is made by Coherent Radiation as model No. 305. Digital signals generated by the character generator 18 and representing information data to be printed, and digital signals generated by the apparatus designated generally 100 and representing graphic forms data to be printed are transmitted to OR gate 20 over lines 22 and 24 respectively. The output of OR gate 20 is sent via AND gate 21 over line 26 where the digital signals pulse modulate an RF generator 28.

The RF pulses from RF generator 28 are transmitted over line 30 to the piezo-electric electrodes of modulator 16. When a RF voltage is present at the electrodes, the path of a portion of the laser beam through the modulator 16 is deflected slightly from the normal path travelled through the slab when no RF signal is present. The beam of light emerges from the modulator 16 to travel through lens 14 which narrows the cross section of the beam of light. From there it impinges on a reflecting mirror 32 and then onto a rotating polygonal mirror 34. The planar surfaces of the rotating mirror 34 have the effect of sweeping the laser beam in a linear fashion at a periodic rate. The mirror is arranged with respect to the beam of laser light so that impingement of the laser beam upon a light sensitive, rotational printing member such as photo-conducting drum 36 depends upon the presence of an RF voltage at the piezo-electric electrodes. More specifically, when an RF voltage is present, the laser beam will impinge on the drum, otherwise it will not.

Dotted block 38 shows a three dimensional view of photo-conducting drum 36 along with a pair of photodetectors 40 and 42. In this example, a laser beam sweeps across the photo-conducting drum from left to right. As a laser beam begins its sweep it impinges on photo-detector 40 providing a start of sweep signal for use with the printing apparatus. At one point on the circumference of drum 36 in the extreme right hand portion there is located a top of page indicator mark 41. A light source 43 continually illuminates the extreme right hand portion of the drum 36 and light reflected therefrom is detected by photodetector 42. When top of page indicator mark 41 interrupts the reflected light a top of page signal is generated.

Printer controller 44 controls the output of the character generator via signals over lines 47, 49, 51 and 52, and the rotation of the polygonal mirror 34 via signals over line 50. Printer controller 44 and character generator 18 are well known devices to those skilled in the art but a brief description of their operation is given below.

The printer controller 44 receives information data to be printed from a host computer or memory device such as a magnetic tape via line 46. This information is stored a page at a time in the page buffer memory portion of the printer controller. The data is then transmitted from the page buffer memory portion in computer code to the character generator via parallel data lines represented by line 47 in FIG. 1 where it is translated into alpha numeric characters which are printed as a series of row sweeps of the modulated laser beam as described above. Each character must be printed in a minimum size matrix of dot spaces, called a character space. The character space comprises n columns and m rows of dot spaces.

Printer controller 44 comprises a high repetition rate master clock which provides basic timing for the printer by generating periodic timing signals called character clock signals. The character clock signals divide the laser sweep into a series of dot spaces and also control the rotation of the polygonal mirror. The character clock signals are also transmitted to electronic circuit portion 100 via line 48.

First counter circuitry within the printer controller counts the n columns of dot spaces in each character space crossed by the laser beam as it sweeps across the photo-conducting drum. After n counts, the first counter circuitry begins over and a character column clock signal is provided to second counter circuitry. The count of the first counter circuitry between o and n−1 is monitored continuously by the character generator via control lines represented by line 49.

The second counter circuitry within the printer controller counts the number of character column clock signals transmitted from the first counter circuitry. When this reaches a certain number, for example 132, a row sweep of the laser is finished and an end of sweep signal is generated and transmitted to electronic circuit portion 100 via line 50. The end of sweep signal staticizes the circuitry to recognize that a new sweep of the laser beam will follow, that is, a new line of information will be transferred to the drum 36. The count of the second counter circuitry is monitored by the page buffer memory so that the page buffer can provide the correct character code to the character generator via line 47.

Third digital circuitry within the printer controller counts the number of end of sweep signals to provide a count of the number of row sweeps performed by the laser. After m such counts, a line of 132 character spaces is completed, and a character row clock signal is provided to fourth counter circuitry which feeds the page buffer memory. The count of the third counter circuitry is monitored continuously by the character generator via lines represented by line 52. Monitoring of the first digital circuitry and the third digital circuitry by the character generator provides the necessary information for printing of a line of alpha numeric characters in dot matrix format by a series of row sweeps of a modulated laser beam. Monitoring of the second counter circuitry and the fourth counter circuitry allows the page buffer memory to transfer new data to the character generator when required.

Now it is equally important that the printer recognizes the end of a page of printing. To accomplish this the printer controller 44 receives a top of page signal from photodetector 42 over line 57. This provides an initial starting point from which the number of sweeps of the laser can be counted as the photo-conducting drum rotates. After a predetermined number of sweeps, the page of data is completed and an inhibit signal is sent over line 58 to AND gate 21 which prevents any data from passing to RF generator 28. This inhibit signal can be removed by the printer controller either by further counting by the controller circuitry or by another top of page signal on line 57.

Referring once again to FIG. 1, a rotatable cylindrical forms mounting drum such as drum 60 is connected by belt 62 to photo-conducting drum 36 to rotate synchronously therewith. A graphic forms master such as the simplified graphic forms designated generally 600 in FIG. 4 is mounted on the forms drum 60 and rotates therewith. The possible designs of the graphic forms master for use with the invention are unlimited but black and white photographs or typewritten pages are examples of suitable masters.

A light source 64 is located near forms drum 60 and is disposed to illuminate a graphic forms master and create a reflected light image thereof. Optical lens 66 is disposed to receive a portion of the reflected light and create an image which is reduced in size by a factor of 2 or 3 in the preferred embodiment. A linear portion of the reduced image is then intercepted by a light sensitive portion of the electric circuit portion 100.

FIG. 2 is a representation designated generally 400 of a printed output of a laser printer using the graphic forms overlay apparatus of this invention. Graphic forms data comprises the horizontal and vertical lines 402 through 416 and the symbols (such as a letterhead) in region 418. The information data from the character generator is represented by the alpha numeric characters in column regions 420 to 426. The representation in FIG. 2 is an example only, and the graphic forms masters for use with this invention are not limited by that representation.

Figure 3:
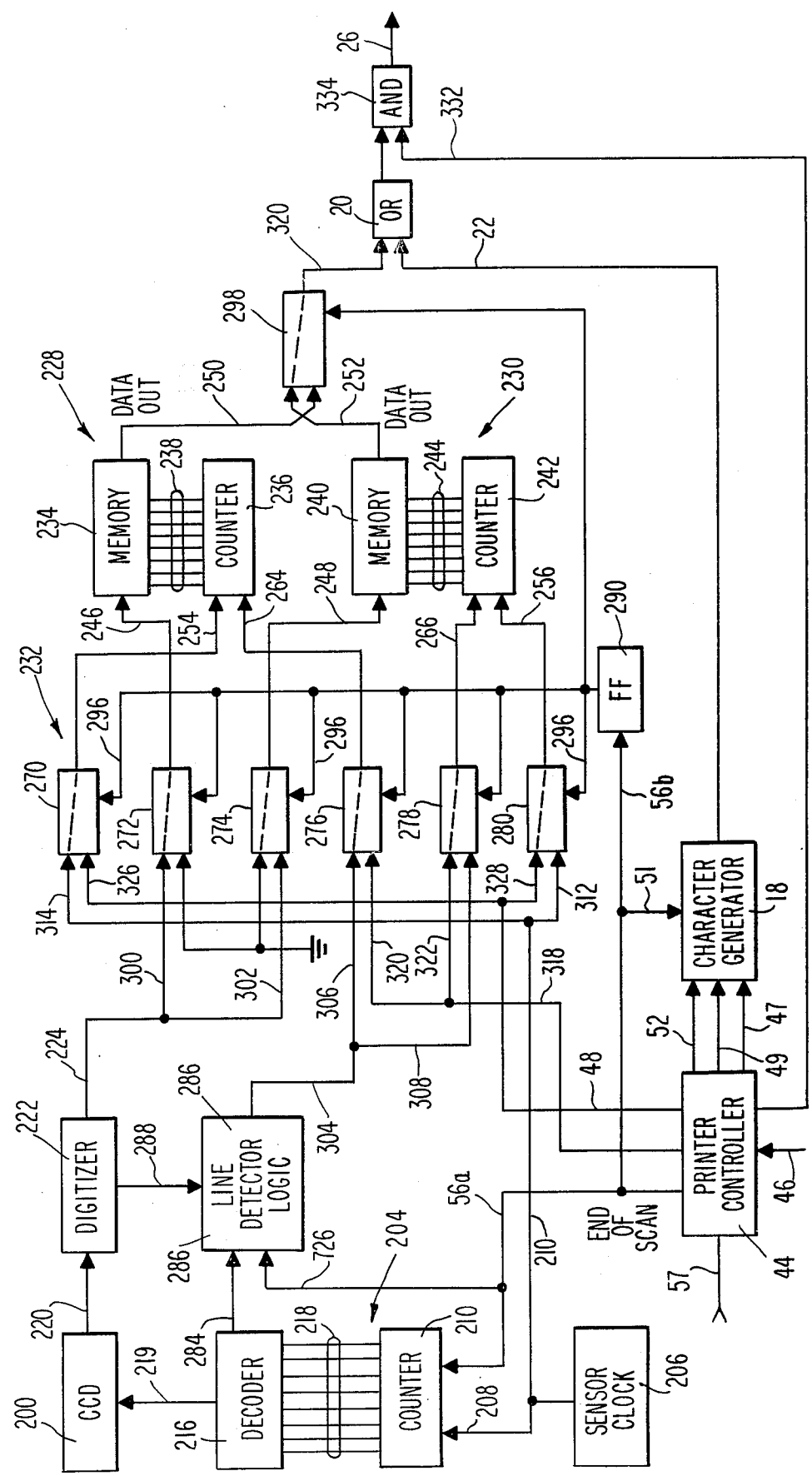
FIG. 3 is a preferred embodiment block diagram of a portion of the graphic forms overlay apparatus.

FIG. 3 is a more detailed block diagram of the electronic circuit portion 100 of the graphic forms overlay apparatus. The light sensitive portion of the electronic circuit portion 100 which intercepts a linear portion of the reduced reflected light image is in the preferred embodiment, a charge coupled device (CCD) 200. A preferred embodiment CCD is a semiconductor device in which charges accumulated within the photosites of the device are transferred in parallel from the photosites into a shift register within the device. The charges are then serially shifted out of the CCD as a plurality of electrical signals. In the preferred embodiment, the suitable charge coupled device is a Fairchild CCD 121 which comprises a row of 1,728 image sensor elements or photosites. As image photons from the light image of the graphic forms master are absorbed in the photosites they create hole electron pairs. The photon generated electrons are accumulated in the photosites, and the amount of charge is a linear function of the incident illumination intensity and the integration time. Each photosite in CCD 200 of FIG. 2 is approximately 8 micrometers wide by 17 micrometers high with a 5 micrometer separation between cells.

The lens 66 of FIG. 1 must focus the reduced light image of the graphic forms master onto a small sensing area, a linear portion of which is intercepted by the photosites of the CCD. The focusing must be done without excessive smearing of the image. Because the light sensitive area of the CCD is so small (1728×13 microns×17 microns), a small graphic forms master can be used. A form four or fives times smaller than full size, in both dimensions, and reduced by a factor of about two or three by the action of the lens 66, will provide a proper linear image for the CCD 200. The image corresponds to a single laser sweep of photo-conducting drum 36. Accordingly, the drum 60 can be made smaller and lighter and the distance between components such as the drum 60, lamp 64, lens 66 and CCD 200 can be small. This is an advantage over the prior art because it enables a small lightweight graphic forms apparatus to be used.

Usually, the forms drum 60 will make a complete revolution when the photo-conducting drum 36 does. However, more than one graphic forms master could be placed on the forms drum 60 and the connection between drums geared to provide only a fraction of one full rotation of the forms drum with a complete rotation of the photo-conducting drum. In this way, different forms could be placed on sequential pages of data if this were desired. For example, if five forms masters were placed on the forms drum, the forms drum would rotate 1/5 of a revolution for each revolution of the photo-conducting drum 36. Of course, a plurality of graphic forms could be placed on a single graphic forms master. When used within the context of this invention a graphic forms master represents the original(s) of the form or forms to be printed with data. The use of a plurality of graphic forms in this manner is practical because of the size reduction mentioned earlier.

In order to operate the CCD described above certain drive signals are required. For example, a transfer signal is needed to transfer the accumulated charge from the photo-sites to the CCD shift registers. Shift register clocking signals move the charge packets to the CCD preamplifier, from where the electrical signals representing an electronic image of a linear portion of the reflected light image of the graphic forms master are transmitted.

The necessary drive signals for the CCD are provided by a first digital circuit designated generally 204. A free running sensor clock 206 is provided which generates the primary timing signals for operation of the CCD. The timing signals are transmitted over line 208 to counter 210 which in the preferred embodiment is comprised of several 74161 TTL devices. The counter increments from a count of zero to some number which is larger than the total number of cells in the CCD. The count is restarted by a periodic reset pulse provided by the printer controller 44 over line 56a.

The counter is connected over parallel lines 213 to decoder 216. As the counter is cycling through numbers, various time slots are decoded by the decoder which are used to form various clock pulses needed to operate the CCD. The drive signals for the CCD are adequately described in the Fairchild Data Book containing a description of the Fairchild CCD 121. The design of a decoder 216 to provide the necessary drive signals as described in the Fairchild Data Book is conventional and is not shown here in detail but is represented by the block 216 in FIG. 2 shown connected to CCD 200 by a plurality of lines 219.

The electrical signals from the CCD are transmitted via line 220 to a second digital circuit means for receiving the electrical signals as graphic forms image electrical signals and for transmitting the image electrical signals for printing with information data electrical signals from a character generator for example. A digitizer circuit 222 designed around a Signetics NE529 comparator chip puts the electrical signal waveforms from the CCD into suitable image electrical signals so that they can be propagated through the digital circuitry which follows. This is a conventional and well known process involving amplification and pulse shaping, and, accordingly, the details of block 222 are not given here.

In the preferred embodiment, the pulses representing graphic forms image electrical signals from digitizer 222 are transmitted via line 224 to one of two memory devices designated generally 228 and 230 via a switching means designated generally 232. Memory device 228 comprises a random access memory (RAM) 234 such as two 1024 X1 bit Fairchild SL40938 RAMS and a binary counter 236 such as four 74161 TTL devices connected to RAM 234 by sixteen parallel lines 238. Similarly, memory device 230 comprises a RAM 240 and a binary counter 242 connected to RAM 240 by parallel lines 244.

Image electrical signals are transmitted into RAM's 234 and 240 from the switching means 232 via lines 246 and 248 respectively and transmitted from RAMs 234 and 240 via lines 250 and 252 respectively. The image electrical signals as they are entered into a RAM are stored in a location according to the binary count on parallel lines connecting a RAM with a binary counter. Similarly, when image electrical signals are transmitted from a RAM they are accessed from a particular location within the RAM in accordance with the count on the parallel lines 238 or 244.

In the preferred embodiment, memory devices 228 and 230 comprise a memory means for simultaneously storing and transmitting the graphic forms image electrical signals. To accomplish this, image electrical signals to be printed during a current laser sweep are stored in a first RAM during the previous laser sweep. Image electrical signals to be printed during the immediately following laser sweep are stored in the second RAM during the current laser sweep and transmitted from the second RAM during the immediately following laser sweep. Meanwhile, the first RAM stores electrical signals during the immediately following laser sweep. The roles of each memory device 228 and 230 switch back and forth periodically between storage and transmission during the periodic laser sweeps of the printer. One memory device transmits image electrical signals while the other is storing image electrical signals. Each RAM must be large enough to store one entire sweep line of data.

The binary counters 236 and 242 are driven by clocking signals received over lines 254 and 256 respectively from the switching means 232. The clocking signals for writing or storing graphic forms data in a RAM are the sensor clock signals generated by sensor clock 206, while the clocking signals for reading or transmitting graphic forms data from a RAM (such as RAM 234 or 240) are the character clock signals generated by printer controller 44.

Counters 236 and 242 further receive reset signals from the switching means 232 over lines 264 and 266 respectively. When the writing of signals into a RAM is finished the counter is reset by a reset pulse (delayed start of sweep signal) to set the counter to begin over again from zero for reading of the signals from the RAM by the character clock signals on line 254 or 256. Similarly, when reading of the signals from the RAM is finished, a different reset pulse to be described later is furnished to the counter to set the counter to zero in preparation for writing signals into the RAM by the sensor clock signals.

Hence, a first group of signals, including a reset signal and character clock signals, are sent to a first memory device while a second group of signals, including a different reset signal, sensor clock signals and image electrical signals, are sent to a second memory device at the same time. When the printing of a line of data is finished, the two groups of signals must be switched between the two memory devices. To accomplish this, the switching means comprises a plurality of multiplexers including multiplexers 270 through 280.

A simplified block diagram of a multiplexer 500 such as those used in FIG. 2 for multiplexers 270 through 280 is shown in FIG. 5. In the preferred embodiment, two data input lines, A and B, are provided to the multiplexer 500. A third control line or select line C is also inputted to multiplexer 500. Depending on the status of select line C as high or low, the output of multiplexer 500 switches between A and B. A multiplexer suitable for use as multiplexers 270 through 280 is a 74157 TTL device.

The select function for each of the multiplexers 270 through 280 is provided by the end-of-sweep signal from printer controller 44 which end-of-sweep signal drives a flip flop 290 via line 56b. The output of flip flop 290 alternates between high and low for successive end-of-sweep signals received (hence the multiplexers are alternating switches). Sensor clock signals over line 314 and character clock signals over 326 (which are used to step the counters as explained earlier) are the A and B inputs respectively to multiplexer 270 whose output is connected via line 254 to counter 236. These clocking signals are reversed as inputs to multiplexer 280 via lines 328 and 312. The output of multiplexer 280 is connected to counter 242 via line 256.

The output of digitizer 222 is provided to the A input of multiplexer 272 via line 300 and to the B input of multiplexer 274 via line 302. The B input of multiplexer 272 is connected to the A input of multiplexer 274 and then grounded. The output of multiplexer 272 is transmitted over line 246 to the data input of RAM 234 while the output of multiplexer 274 is transmitted via line 248 to the data input port of RAM 240. Hence, the image electrical signals are alternately stored in the RAMS 234 and 240.

The memory reset output from alignment circuitry 286 is provided to the A input of multiplexer 276 via line 306 and to the B input of multiplexer 278 via line 308. There the counter associated with the RAM which will next receive graphic information is reset at the end of transferring a line of information from the CCD to the other RAM. A start-of-sweep reset input is provided via line 320 to the B input of multiplexer 276 and to the A input of multiplexer 278 via line 322. The output of multiplexer 276 is connected to the counter 236 while the output of multiplexer 278 is connected to counter 242. Hence the counter associated with the RAM which will next transfer information to be printed will be reset at the beginning of a sweep of the xerographic drum.

In any graphic forms overlay apparatus, it is necessary to properly align the graphic forms master so that the image of the graphic forms master will be printed in proper relationship to the information data. Lateral alignment of the graphic forms master is done automatically by the electronic circuit portion 100 of applicant's application. The graphic forms master 600 of FIG. 4 is equipped with a vertical alignment mark 602 in a portion of the margin area 604 of the graphic forms master 600. The margin area 604, which contains no information data, surrounds the active area 606 within which all printing takes place on the output copy of the printer. The margin area is normally white and highly reflective while the line 602 appears dark. In the preferred embodiment, the alignment mark 602 is wide enough to cover several adjacent photo sites in CCD 200, for example, two. The alignment mark 602 is located at a fixed number of CCD photo sites (for example, N Cells) from the edge 608 of the active area 606. Hence, the left hand margin area 604 and alignment mark 602 create an image in the CCD of two "dark" photo sites surrounded by many "white" photo sites. This creates a distinctive pattern of adjacent low level signals surrounded by high level signals coming from the CCD.

After the charges in the photo sites in CCD 200 have been transferred to the CCD shift register on command from the decoder 216, sensor clock signals transmitted from the decoder begin to shift the electrical signals from the CCD 200 to the digitizer 222. At the same time, in FIG. 6, sensor clock signals are provided to line detector logic 286 via line 284 where they clock the output of digitizer 222 via line 288 into serial shift register designated generally 700 comprising 4 cells, 702, 704, 706 and 708 in this example. At the same time, data is clocked over line 224 into a RAM via switching means 232.

The first image electrical signals transmitted from digitizer 222 represents an electrical image of the left hand margin portion of margin area 604 including alignment mark 602 of graphic forms master 600. The image electrical signals associated with the area between edge 603 of graphic forms master 600 and alignment mark 602 is highly reflective and a series of high signals are produced by digitizer 222. Alignment mark 602 is dark and causes two low signals to be produced by digitizer 222. As the electrical signals enter into shift register 700, they are first inverted by inverter 710 so that the first signals in the shift register 700 are low signals followed eventually by 2 high signals.

Cells 702 and 704 of shift register 700 are connected directly to AND gate 712 while cells 706 and 708 are connected in series with inverter 714 and 716 respectively to AND gate 712. Hence, when the two high signals associated with alignment mark 602 are entered into cells 702 and 704 preceded by two low signals associated with margin area 604, AND gate 712 provides a high output to the set input of flip flop 718. The Q output of flip flop 718 is connected to the D input of D flip flop 720 and also to AND gate 722. The X output of D flip flop 720 is connected to AND gate 722 in series with inverter 724.

When the Q output of flip flop 718 goes high, the X output of D flip flop 720 remains low until the leading edge of the next sensor clock signal arrives at the clock input to D flip flop 720. Between the time that flip flop 718 is set and the arrival of the next sensor clock signal at D flip flop 720, the output of AND gate 722 is high since the low X output of D flip flop 720 is inverted by inverter 724. This period of time is roughly one sensor clock pulse to pulse interval. When the leading edge of this next sensor clock signal is received by D flip flop 720, the X output of flip flop 720 goes high and the output from AND gate 722 goes low and remains low throughout the remaining transmission of electrical signals from CCD 200 regardless of the contents of shift register 700. This is so since the output of the flip flops 718 and 720 remain fixed until they are reset.

The high output of AND gate 722 is the reset pulse which is transmitted from line detector logic 286 over line 304 to switching means 232 in FIG. 3. Via the switching means 232, the reset pulse is routed to the load port of either counter 236 or 242. The reset pulse loads the counter to countdown $N-1$ times before clearing. While this is happening, image electrical signals from digitizer 222 associated with margin area 604 between alignment mark 602 and edge 608 of active area 606 are being stored in one of the rams 234 or 240. This is not important, however, since the counter associated with the appropriate RAM finishes its countdown and clears the counter so that electrical signals associated with the active region 606 of graphic forms master 600 is loaded into the ram starting with address 0.

At the end of a laser sweep, an end of sweep signal is sent over line 726 to reset flip flop 718. Line detector logic 286 is now ready to provide a reset signal once again when shift register 700 is appropriately loaded as described above.

Vertical or circumferential alignment of the graphic forms master on the forms drum 60 can be accomplished in many ways. In the preferred embodiment, the graphic forms master is manually positioned at a predetermined location on the forms drum such that the first linear portion of the active region 606 of the graphic forms master to be imaged and printed is focused onto CCD 200 before the first sweep of the laser by which the first linear portion is printed. As the photo conducting drum rotates so will the forms drum so that all subsequent sweeps and CCD images are properly aligned. The predetermined location on the forms drum is found by trial and error initially and then indicated by a separate mark or means on the forms drum. The graphic forms master to be mounted on the forms drum is then aligned with the mark or means. This mark or means on the forms drum assumes that a fixed circumferential relationship exists between the forms drum and the photo-conducting drum at the start.

The circuitry of FIG. 3 operates in the following way: An end of sweep signal generated by the printer controller 44 is transmitted to counter 210 over line 56a; to line detector logic 286 over line 726; to flip flop 290 over 56b; and to the character generator 18 over 51. The end of sweep signal to counter 210 resets the counter 210 to zero and resets line detector logic 286 as described above. Flip flop 290 provides alternating high and low signals over line 296 to the select terminal on each of the multiplexers 270 through 280 and multiplexer 298 in responses to the end of sweep signals. The effect of these high and low signals is to switch the output of the multiplexers from one input line to the other. For purposes of this example, it is assumed that the last end of sweep signal resulted in all of the multiplexers being switched to the up or A position as shown by the dotted lines in each of the multiplexers.

The counter 210 begins a new count in response to the end of sweep signal and decoder 216 provides a transfer signal to CCD 200 which transfers the charges in the photo sites to the CCD shift register. The sensor clocking signals from the decoder serially shift the charges within the CCD to a CCD preamplifier which transmits electrical signals along line 220 to digitizer 222. The graphic forms image electrical signals from digitizer 222 are transmitted to line detector logic 286 over line 288 and to multiplexers 272 and 274 over line 224 and then over lines 300 and 302 respectively.

When alignment circuitry 286 detects alignment mark 602 as described above, a reset signal is transmitted from alignment circuitry 286 to the multiplexers 276 and 278 over line 304 and then lines 306 and 308. The reset signal passes through multiplexer 276 to counter 236 over line 264 to load the counter 236 as described above. After counter 236 counts down and clears, image electrical signals from the CCD 200 and the digitizer 222 passes through multiplexer 272 for storage in memory 234. Image electrical signals representative of the edge 608 of active area 606 are the first signals stored in memory 234, after $N-1$ counts following the arrival of the reset signal at counter 236. Image electrical signals are clocked into the memory by the sensor clock which transmits signals over line 310 and then lines 312 and 314 to multiplexers 270 and 280 respectively. For the state of the multiplexers given in this example, the sensor clock signals pass through multiplexer 270 to counter 236. Memory 240 and counter 242 are unaffected by the image electrical signals or by the sensor clock or line detector logic reset signals because of the state of multiplexers 270 through 280. The loading of data from the CCD to memory 234 in response to signals from sensor clock 206 must be completed by the next end of sweep signal at which time the multiplexers will switch the image electrical signals, the sensor clock and the alignment circuitry reset signal to the memory 240 and counter 242.

At the same time that image electrical signals are being stored in memory 234, previously stored signals from memory 240 are being transmitted for placement on the photo-conducting drum. Following the end of sweep signal mentioned earlier, the laser will generate a start of sweep signal in photodetector 40 as it starts a new sweep. This start of sweep signal is transmitted over line 318 and then lines 320 and 322 to multiplexers 276 and 278 respectively. The start of sweep signal will pass through multiplexer 278 to reset counter 242 to zero. Character clock signals are transmitted over line 48 and and then lines 326 and 328 to two multiplexers 270 and 280 respectively. The character clock signals pass through multiplexer 280 to counter 242 to clock the signals previously stored in memory 240 out along line 252 to multiplexer 298 and then along line 330 to OR gate 20. The same addresses of the counter which stored the image electrical signals starting precisely with the edge 608 of the active area transmit the signals starting precisely with the start of the character clock. This insures automatic lateral alignment of the graphic forms pattern with the information data when printed. At the end of the sweep when an end of sweep signal is generated, flip flop 290 switches the output of the multiplexers to the opposite input and the roles of the memory devices 228 and 230 are reversed.

Vertical alignment of the graphic forms master with the information data is done as follows: the printer controller 44 receives a top of page signal from photodetector 42 over line 57. This provides an initial starting point for which the number of sweeps of the laser can be counted as the photo-conducting drum rotates. After a predetermined number of sweeps a page of data is completed and an inhibit signal (generated by counter circuitry within the printer controller) is sent over line 332 to AND gate 334 which prevents any data from passing to RF generator 28. This inhibit signal is removed by the printer controller when another top of page signal is received on line 330.

The location of the graphic forms master on the forms drum is such that two laser sweeps before the inhibit signal is removed, that is, before further rotation of the photo-conducting drum causes a top of page signal to be generated, a reflected light image of the first linear portion of the graphic forms master to be printed with the start of printing of a new page impinges on the CCD. During the last laser sweep before the inhibit signal is removed, the charges in the CCD from the previous laser sweep are clocked into one of the memories 234 or 240 and the alternating process described above begins.

While the present invention has been disclosed in connection with the preferred embodiment thereof, it should be understood that there may be other embodiments which fall within the spirit and scope of the invention as defined by the following claims.

What is claimed:

1. A forms overlay apparatus to be used with a light sensitive, rotational printing member of a printing system to enable said printing member to print a graphic forms pattern and information data in a single printing operation, and which printing system includes circuitry means to accept and transform information data from a data information source into representative electrical signals, and includes further circuitry means to generate first control signals, comprising in combination:

rotating mounting means formed to have a graphic forms master disposed thereon, said rotational mounting means coupled to said rotational printing member to rotate in a predetermined relationship therewith;

light source means disposed to transmit light to said rotating graphic forms master to create reflected light images thereof;

light sensitive logic means for receiving linear light images and for generating simultaneously a plurality of image electrical signals representative thereof;

optical means disposed to receive a linear portion of said reflected light images for focusing said linear portion or said light sensitive logic means;

first logic circuitry means coupled to said light sensitive logic means for generating second control signals for operation of said light sensitive logic means;

second logic circuitry means connected to said light sensitive logic means, said first logic circuitry means, and said printing system to receive and merge image electrical signals and information data electrical signals in response to said first and second control signals;

light source-optical system means disposed to selectively affect incremental light transmissions to said light sensitive printing member in response to electrical signals applied thereto; and circuitry means connecting said second logic circuitry means to said light source-optical system means.

2. The invention of claim 1 wherein said printing system images electrical signals on said printing member in a series of linear sweeps of row dot spaces;

said rotating mounting means advances said graphic forms master in synchronization with said linear sweeps; and said light sensitive logic means receives a different linear portion of said reflected light images with each of said linear sweeps.

3. The invention of claim 2 wherein said second logic circuitry means comprises a memory means for simultaneously storing image electrical signals received from said light sensitive logic means and associated with one of said linear portions of said reflected light images and for transmitting image electrical signals received from said light sensitive logic means and associated with a different one of said linear portions of said reflected light images to said light source optical system means via said circuitry means.

4. The invention of claim 3 wherein said second control signals comprise sensor clock signals, said sensor clock signals connected to said memory means and cooperating with said memory means for storing said image electrical signals associated with one of said linear portions in said memory means; and wherein said first control signals comprise character clock signals, said character clock signals also connected to said memory means and cooperating with said memory means for transmitting said image electrical signals associated with a different one of said linear portions.

5. The invention of claim 3 wherein said image electrical signals received from said light sensitive logic means and associated with one of said linear portions includes a pattern of electrical signals associated with an alignment mark on said graphic forms master, and said system further comprises an alignment circuit means for recognizing said pattern of electrical signals and for transmitting to said memory means a reset signal to store said image electrical signals associated with one of said linear portions in a predetermined location within said memory means whereby when said image electrical signals associated with one of said linear portions are transmitted, said image electrical signals are properly overlayed with said information data electrical signals when printed.

6. The invention of claim 5 wherein said reset signal coordinates the transmission of said image electrical signals from said memory means with the start of a linear sweep of said printing system.

* * * * *